Nov. 20, 1934.  W. GOERG  1,981,354
LIQUID GAUGE
Filed April 28, 1932
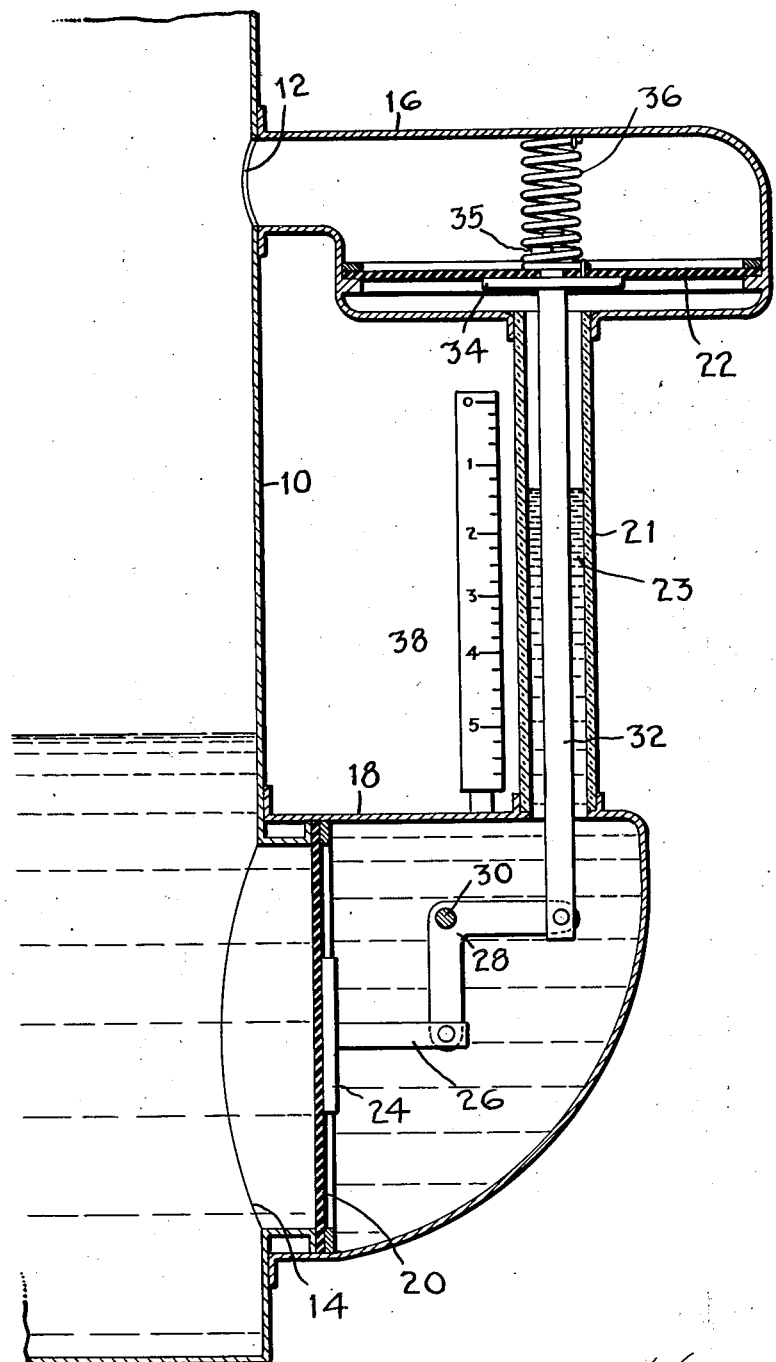
INVENTOR
Walter Goerg
BY
ATTORNEY Patented Nov. 20, 1934

1,981,354

UNITED STATES PATENT OFFICE 1,981,354

LIQUID GAUGE

Walter Goerg, Woodcliff, N. J., assignor to Air Reduction Company, Incorporated, New York, N. Y., a corporation of New York Application April 28, 1932, Serial No. 607,979

7 Claims. (Cl. 73—54)

This invention relates to a liquid gauge or indicator for tanks, and more especially for acetylene generators of the carbide to water type. Gauges embodying the invention can be used to indicate the level of liquid in the tank, the quantity of liquid, the amount of liquid in relation to a standard of reference, or the degree of surplus or deficiency of liquid in relation to a condition of sufficiency.

The ordinary visual water level indicator commonly used on tanks includes a glass tube, which has both its upper and lower ends communicating directly with the interior of the tank through fittings connected with the side of the tank. Such a gauge is simple in construction, but has certain inherent disadvantages, particularly if used to indicate the height or amount of water in acetylene generators of the carbide to water type. If the glass in such a gauge is accidentally broken, the gas from the generator will escape through the gauge, and this gas may cause fire or explosion. Another disadvantage is the fouling or choking of the gauge by sediment which accumulates in the water conduit, particularly in the conduit through the bottom fitting. In the ordinary type of gauge, the water level in the gauge glass is the same as the water level in the tank. This determines the location of the gauge glass and sometimes causes the gauge to be located in an inconvenient position for reading.

An object of this invention is to provide a liquid-level or liquid-amount gauge in which flexible diaphragms prevent fluid in the tank from flowing through the gauge fittings, and to provide pressure-transmitting means and an indicator between the flexible diaphragms, the indicator being moved by or with the flexing of the diaphragms. Such a gauge is particularly useful on tanks in which the gas or vapor over the liquid is above or below atmospheric pressure, because the diaphragms neutralize the effect of the gas or vapor pressure and make the gauge absolutely leakproof, there being little or no possibility of the diaphragms being broken so that air can leak into the tank or fluid under pressure escape from the tank.

Another object of this invention is to provide a gauge-glass water-level or water-amount indicator in which the liquid in the gauge-glass is not in direct contact with the water in the tank, a diaphragm being provided through which the water in the tank transmits pressure to the liquid in the gauge. When such a gauge is used with an acetylene generator, the diaphragm prevents the slaked lime in the tank from entering the gauge, and thus prevents possible clogging of the gauge. A further object is to provide such a gauge with a diaphragm, above the gauge-glass, for preventing gas in the tank from flowing through the gauge to the gauge-glass. Such an arrangement makes it impossible for gas to escape from the tank if the gauge-glass becomes broken.

A further object is to provide a gauge-glass water-level gauge, in which the pressure of the liquid in the tank is transmitted to the liquid in the gauge-glass through a diaphragm which is loaded so that readings on the gauge-glass will be at a different level from the water in the tank. Such an arrangement makes it possible to have the level in the gauge-glass at a convenient location for taking readings.

Other objects and advantages of the invention will appear or be pointed out as the description proceeds.

The drawing shows a sectional view of a water-level indicator made in accordance with this invention.

An acetylene generator water tank 10 has upper and lower openings 12 and 14, respectively, and upper and lower gauge fittings 16 and 18, respectively, are connected with the tank over the openings.

Associated with the lower gauge fitting is a diaphragm 20, which prevents liquid in the tank 10 from entering the fittings. A gauge-glass 21 is held by the fittings, as shown in the drawing, each of the fittings having an orifice opening into the end of the gauge-glass. A diaphragm 22 associated with the upper gauge fittings 16 prevents gas from flowing through this upper fitting. Thus, if the glass 21 is broken, the diaphragm 22 will prevent the escape of gas from the tank.

A body of indicating liquid 23 is contained in the large well of the lower fitting 18 and a portion of it stands in the glass 21, this body of liquid being quite cut off from the liquid in the tank by the diaphragm 20.

A disk 24 is secured to the diaphragm 20, and a stem 26 is connected with this disk. A bellcrank 28 is pivotally mounted on a shaft 30. This shaft 30 is supported by the gauge fitting 18.

The stem 26 is pivotally connected with one end of the bell-crank 28. A rod 32 is pivotally connected with the other end of the bell-crank, and this rod extends upwardly through the gauge-glass 21 and connects with a disk 34.

This disk 34 contacts with the lower side of the diaphragm 22. A nut 35 is threaded on the upper and of the rod and clamps the diaphragm 22 against the disk 34. A spring 36 is located between the top wall of the gauge fitting 16 and the upper side of the diaphragm 22. In the embodiment of the invention illustrated, the spring 36 is under tension and loads the diaphragm 22 directly. The load of the spring is transmitted through the disk 34, rod 32, bell-crank 28, stem 26, and disk 24, to the diaphragm 20.

The fitting 18 is filled with a liquid 23 behind the diaphragm 20, and this liquid is displaced into the gauge-glass when the diaphragm is flexed by water pressure in the tank.

A scale 38 is located alongside of the gauge-glass, and legends are provided on the scale to indicate the amount of water in the tank. The scale shown in the drawing is marked with minus indications, which denote the drop in the water below a predetermined level to which the tank is initially filled.

When the tank 10 is filled to this initial level, the water pressure on the lower diaphragm 20 will deflect this diaphragm to the right, in the drawing, and cause the liquid outside the diaphragm to stand in the gauge-glass at the level of the zero indication of the scale. As the water level in the tank drops, the pressure on the diaphragm 20 will decrease, and the pressure of the water column in the gauge-glass will force the diaphragm to the left in the drawing. This movement of the diaphragm 20 will permit the liquid level in the gauge-glass to drop until it again balances the water in the tank.

If the spring 36 is omitted, the liquid level in the gauge-glass will always stand at the same level as the water in the tank. If the spring 36 is under compression, the liquid level in the gauge-glass will be lower than the water level in the tank. With the spring 36 under tension, the liquid level in the gauge-glass stands higher than the water level in the tank. It is not necessary to load the diaphragm with a spring unless it is desirable to have the level of liquid in the gauge-glass stand higher or lower than the water level in the tank. Such a difference in the level may sometimes be desirable to bring the gauge-glass level to a position where it is easy to observe. The scale must be calibrated for the particular spring loading used. The invention is not limited to spring loading, and weights or other means may be substituted.

It is evident that the pressure of the gas in the tank will have no effect on the working of the indicator. The gas pressure will be transmitted through the liquid and increase the pressure against the lower diaphragm, but this increase, caused by the gas pressure, is balanced by the equal pressure which acts on the top of the upper diaphragm 22 and is transmitted through the rod 32, bell-crank 28, and stem 26, to the other side of the diaphragm 20.

The preferred embodiment of this invention has been illustrated and described particularly for use with acetylene generators, for which it is unusually well adapted. However, it is well suited for use with other types of tanks or containers, and various changes and modifications may be made in the structure described without departing from the spirit of the invention as set forth in the appended claims.

I claim:

1. A water-level indicator including upper and lower gauge fittings; a gauge glass held at opposite ends of said fittings, a flexible diaphragm in the lower fitting for preventing liquid from flowing through the lower fitting; a flexible diaphragm in the upper fitting for preventing fluid from flowing through the upper fitting; and pressure-transmitting means extending through the gauge glass and contacting with both of the diaphragms for transmitting pressure exerted against one diaphragm to the other diaphragm.

2. A water-level indicator including upper and lower gauge fittings; a gauge-glass between said fittings; a flexible diaphragm in the lower fitting; liquid in the lower fitting retained therein by the diaphragm; a flexible diaphragm in the upper fitting for preventing fluid from flowing through said upper fitting; and mechanical pressure transmitting means connecting the two diaphragms so that motion of either diaphragm will be transmitted to the other.

3. A water-level indicator including a gauge fitting for connecting with a tank below the water level of the tank; a flexible diaphragm forming a partition across the inside of the fitting; liquid in the fitting behind the diaphragm; an upwardly extending gauge-glass on the fitting in position to receive liquid which is displaced from the fitting by flexing of the diaphragm; a gauge fitting at the top of the gauge-glass for connecting with the tank above the water level of the tank; a flexible diaphragm in the upper fitting for preventing fluid in the tank from flowing through the top gauge fitting; and mechanical pressure-transmitting means connecting the two diaphragms, a portion of the motion-transmitting means extending through the gauge-glass.

4. A water level indicator for an acetylene generator water tank, said indicator including a lower gauge fitting for connecting with the tank below the water level of the tank; a flexible diaphragm in the lower gauge fitting for limiting the flow of water into said lower gauge-fitting; liquid in the fitting on the side of the diaphragm opposite the tank; a gauge-glass communicating at one end with the lower gauge fitting in position to receive liquid displaced from the fitting by flexing of the diaphragm; an upper gauge fitting connecting with the other end of the gauge-glass and adapted to connect with the tank above the water level of the tank; a flexible diaphragm in the upper gauge fitting for preventing gas in the tank from flowing through said upper gauge fitting; link means extending through the gauge-glass and connected with both of the diaphragms for transmitting pressure from one diaphragm to the other; and a spring loading the diaphragms.

5. A water-level indication including a lower gauge fitting for connecting with a tank below the water level of the tank; a flexible diaphragm forming a partition across the inside of the fitting to limit the flow of water into the fitting; an upper gauge fitting for connecting with a tank above the water level of the tank; a flexible diaphragm in the upper fitting for preventing fluid from flowing through the upper fitting; pressure-transmitting connections between the diaphragms; a member loading the diaphragms; a scale; and an indicator which is moved along the scale by the flexing movement of the diaphragms.

6. A liquid gauge connected with an enclosure containing a liquid surmounted by a gas subject to pressure other than atmospheric, said gauge containing an isolated liquid column and a glass in which said column is visible, and having upper and lower connections with the gas and liquid spaces of the enclosure, flexible diaphragms interposed in both connections, and a mechanical interconnection between said diaphragms for equalizing the effect of the gas pressure.

7. A water-level indicator including a lower gauge fitting for connecting with a tank below the water level of the tank; a flexible diaphragm forming a partition across the inside of the fitting to limit the flow of water into the fitting; an upper gauge fitting for connecting with a tank above the water level of the tank; a flexible diaphragm in the upper fitting for preventing fluid from flowing through the upper fitting; pressure-transmitting connections between the diaphragms; a scale; and an indicator which is moved along the scale by the flexing movement of the diaphragms.

WALTER GOERG.